US011399103B2

(12) United States Patent
Newell et al.

(10) Patent No.: US 11,399,103 B2
(45) Date of Patent: *Jul. 26, 2022

(54) APPARATUS, SYSTEMS AND METHODS FOR GENERATING 3D MODEL DATA FROM A MEDIA CONTENT EVENT

(71) Applicant: DISH TECHNOLOGIES L.L.C., Englewood, CO (US)

(72) Inventors: Nick Newell, Centennial, CO (US); Swapnil Tilaye, Thornton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/891,906

(22) Filed: Jun. 3, 2020

(65) Prior Publication Data

US 2020/0296229 A1 Sep. 17, 2020

Related U.S. Application Data

(63) Continuation of application No. 16/390,705, filed on Apr. 22, 2019, now Pat. No. 10,715,684, which is a (Continued)

(51) Int. Cl.
*G06T 7/579* (2017.01)
*H04N 1/00* (2006.01)
(Continued)

(52) U.S. Cl.
CPC .......... *H04N 1/00164* (2013.01); *B24D 7/16* (2013.01); *B29C 64/386* (2017.08); *B33Y 50/00* (2014.12);
(Continued)

(58) Field of Classification Search
CPC .......... H04N 1/00164; H04N 21/4722; H04N 21/4728; H04N 21/44008; H04N 21/4333;
(Continued)

(56) References Cited

U.S. PATENT DOCUMENTS 6,757,086 B1 6/2004 Mori et al.
6,856,314 B2 2/2005 Ng
(Continued)

FOREIGN PATENT DOCUMENTS

WO 2015173173 A1 11/2015

OTHER PUBLICATIONS

Davis, Tom, "A technique for capturing screen images that work in printed materials," General Glyphics, Inc., http://www.glyphnotes.com/gn-screencapture.cfm, 3 pages.

*Primary Examiner* — Said Broome
(74) *Attorney, Agent, or Firm* — Kilpatrick Townsend & Stockton LLP (57) ABSTRACT

Three dimension (3D) model generation systems and methods are operable to generate 3D model data corresponding to images of a physical object of interest that are viewed in a presenting media content event. An exemplary embodiment receives a user request that is associated with an interest by the user to obtain a 3D model of a physical object of interest that is being shown in a scene of a currently presenting media content event. A plurality of video image frames are selected from the scene. Then, 3D model data of the physical object of interest is generated based on at least the selected video image frames of the scene.

20 Claims, 2 Drawing Sheets

Related U.S. Application Data continuation of application No. 15/364,067, filed on Nov. 29, 2016, now Pat. No. 10,284,731.

(51) Int. Cl.

| | | |
|---|---|---|
| *H04N 21/4728* | (2011.01) | |
| *H04N 21/44* | (2011.01) | |
| *H04N 21/433* | (2011.01) | |
| *H04N 21/4722* | (2011.01) | |
| *B29C 64/386* | (2017.01) | |
| *B33Y 50/00* | (2015.01) | |
| *H04M 1/00* | (2006.01) | |
| *H04N 5/00* | (2011.01) | |
| *B24D 7/16* | (2006.01) | |

(52) U.S. Cl.
CPC ............... *G06T 7/579* (2017.01); *H04M 1/00* (2013.01); *H04N 1/00137* (2013.01); *H04N 5/00* (2013.01); *H04N 21/4333* (2013.01); *H04N 21/44008* (2013.01); *H04N 21/4722* (2013.01); *H04N 21/4728* (2013.01); *G06T 2207/10016* (2013.01); *G06T 2207/20104* (2013.01)

(58) Field of Classification Search
CPC ................ H04N 1/00137; G06T 7/579; G06T 2207/10016; G06T 2207/20104; B33Y 50/00; B29C 64/386

See application file for complete search history.

(56) References Cited

U.S. PATENT DOCUMENTS

| | | | |
|---|---|---|---|
| 7,029,275 B2 | 4/2006 | Rubbert et al. | |
| 7,840,042 B2 | 11/2010 | Kriveshko et al. | |
| 8,243,334 B2* | 8/2012 | Abeloe | B29C 64/386 |
| | | | 358/2.1 |
| 8,412,588 B1* | 4/2013 | Bodell | G06Q 30/0603 |
| | | | 705/26.5 |
| 8,866,883 B2 | 10/2014 | Rohaly et al. | |
| 9,060,832 B2 | 6/2015 | Karim et al. | |
| 9,229,674 B2 | 1/2016 | Tapley et al. | |
| 9,327,350 B2 | 5/2016 | Mannella et al. | |
| 9,420,260 B2 | 8/2016 | McGregor et al. | |
| 10,284,731 B2 | 5/2019 | Newell et al. | |
| 2015/0032242 A1 | 1/2015 | Schouwenburg et al. | |
| 2015/0045934 A1* | 2/2015 | Kallenbach | B29C 64/00 |
| | | | 700/120 |
| 2015/0055085 A1 | 2/2015 | Fonte et al. | |
| 2015/0301517 A1 | 10/2015 | Chen et al. | |
| 2015/0382123 A1 | 12/2015 | Jobani | |
| 2016/0067926 A1 | 3/2016 | Andrews | |

\* cited by examiner

APPARATUS, SYSTEMS AND METHODS FOR GENERATING 3D MODEL DATA FROM A MEDIA CONTENT EVENT

CROSS-REFERENCES TO RELATED APPLICATIONS

This application is a continuation of U.S. application Ser. No. 16/390,705, filed Apr. 22, 2019, which is a continuation of U.S. application Ser. No. 15/364,067, filed Nov. 29, 2016, granted as U.S. Pat. No. 10,284,731 on May 7, 2019, and entitled "APPARATUS, SYSTEMS AND METHODS FOR GENERATING 3D MODEL DATA FROM A MEDIA CONTENT EVENT," the contents of each of which are incorporated herein by reference in their entirety.

BACKGROUND

Emerging three dimensional (3D) printer technologies provide for the creation of physical objects based on pre-defined data. Much like a printer prints a page of a document, a 3D printer "prints" or generates a physical 3D object that is a replica of a real-world physical object. Such technology is commonly referred to as 3D printing (or interchangeably referred to as additive manufacturing). A 3D printing process employs a computer controlled printing system that creates a physical printed 3D object based on 3D printable model data. The printed 3D object represents the shape and appearance of the physical object of interest, though the printed 3D object may be scaled in size compared to its corresponding physical object. That is, a 3D model is definable by 3D printable model data that can be used by a 3D printer to manufacture (interchangeably referred to herein as "printing") a printed 3D object corresponding to a physical object of interest.

A variety of printed 3D object generation technologies, now known or later developed, may be used by a 3D printer device or system (generically referred to herein as a "3D printer"). Non-limiting 3D printer technologies include, but are not limited to, extrusion systems such as fused deposition modeling (FDM) or fused filament fabrication (FFF), robocasting, stereo lithography (SLA), digital light processing (DLP), power bed and inkjet printing, electron-beam melting (EBM), selective laser melting (SLM), selective heat sintering (SLS), direct metal sintering (DMLS), laminated object manufacturing (LOM), direct energy deposition, and/or electron beam freeform fabrication (EBF). A variety of material may be used to create a printed 3D object of interest, such as thermoplastics, rubber, photopolymers, molding clay, plastic powders, plastic films, ceramic powders, thermoplastic powders, metal, metal alloys, metal coils or even paper.

The 3D printable model data may be defined using a stereo lithography (STL) format, or using another suitable 3D model data format now known or later developed. The 3D printable model data may be created using a computer aided design (CAD) system. Alternatively, the 3D printable model data may be generated from captured image data acquired by a 3D scanner system, a 3D digital image capture device (e.g., a digital camera), and/or a series of captured images, also known as photographs, that provide a series of different views of the physical object of interest (such that the 3D printable model data can be determined).

Generating 3D printable model data based on captured images is a particularly challenging endeavor. Active techniques for generating 3D printable model data from captured images employs one or more controlled light sources that project a pattern of light onto the physical object of interest. The projected light patterns may be a series of lines or other predetermined patterns. Also, the camera characteristic may be known (referred to herein as a calibrated camera), such as focal length and the like. Further, the camera location in 3D space with respect to the physical object of interest may be known. And, multiple cameras may be used (commonly referred to as a multi-vantage system) to concurrently capture images of the physical object of interest. For example, two cameras may provide a stereo view of the physical object of interest. These various image capture techniques facilitate determining depth attributes of the various portions of the physical object of interest.

The process of generating 3D printable model data becomes even more difficult if the camera is not calibrated, when controlled light sources are not used, when camera location in 3D space is not known, and/or when a single camera is used for image capture (commonly referred to as a single vantage system). In the arts, generating 3D printable model data from such captured images is commonly referred to as employing a passive technique or method of generating 3D printable model data. Determining depth attributes of the various portions of the physical object of interest with any degree of accuracy or reliability is very difficult and is computationally intensive.

Techniques for generating 3D printable model data from a series of captured images have been developed. Here, the camera no longer needs to be calibrated, controlled light sources are not required, and camera location in 3D space is not needed. The sequence of captured images (separate still images or a video wherein single video image frames are selected for analysis) are captured from a camera (interchangeably referred to herein as an image capture device) as the camera is moved about the physical object of interest. For example, the paper "3D Reconstruction from Multiple Images" by Moons et al. (ISBN: 978-1-60196-284-1), 2010, and incorporated herein by reference in its entirety, details an example technique of generating 3D printable model data for a physical object of interest based on a series of captured images taken by a moving camera.

In an entirely different technology space, media devices are configured to present visually-based media content to a user. Exemplary media devices include, but are not limited to, electronic devices such as a set top box, a television, a computer system, a smart phone, a cellular phone with a display, a game system, or the like.

Presented media content may include still and/or video images, and optionally audio content. The presented media content is referred to herein as a media content event. A media content event presents theme-based visual and audio content to a user for their enjoyment and/or for informative purposes. Examples of such theme-based media content events includes movies, films, serial programming, sporting events, documentaries, newscasts, religious programs, commercials (typically of short duration with advertising content), video games, or the like. Serial programming may present a continuing plot and/or theme, often with the same cast of actors, in a sequential episode-by-episode basis that is available periodically. Advertisements, commercials or the like may be interspersed within the media content event. However, such advertisements, commercials or the like are also a media content event, though of a smaller duration than a typical theme-based media content event. In contrast, a web page available from an internet site or the like presenting a choice of physical objects of interest for which printed 3D objects, 3D printable models, and/or 3D printable model data can be ordered and/or obtained from is not a media content event as defined herein.

Such media content will present images of physical objects to the viewing user. In the event that the viewing user sees a particular physical object presented in the media content event, and in the event that the user would like to obtain a printed 3D object corresponding to the viewed object of interest, there simply is no practical way or convenient way for the user to satisfy their need to obtain the printed 3D object. Accordingly, there is a need in the arts to enable a user to obtain printed 3D printable model data of an object of interest corresponding to a presented physical object seen by the user who is viewing media content event on their electronic device.

BRIEF SUMMARY

Three dimension (3D) model generation systems and methods are operable to generate 3D model data corresponding to images of a physical object of interest that are viewed in a presenting media content event. An exemplary embodiment receives a user request that is associated with an interest by the user to obtain a 3D model of a physical object of interest that is being shown in a scene of a currently presenting media content event. A plurality of video image frames are selected from the scene. Then, 3D model data of the physical object of interest is generated based on at least the selected video image frames of the scene.

BRIEF DESCRIPTION OF THE DRAWINGS

Preferred and alternative embodiments are described in detail below with reference to the following drawings.

DETAILED DESCRIPTION

Figure 1:
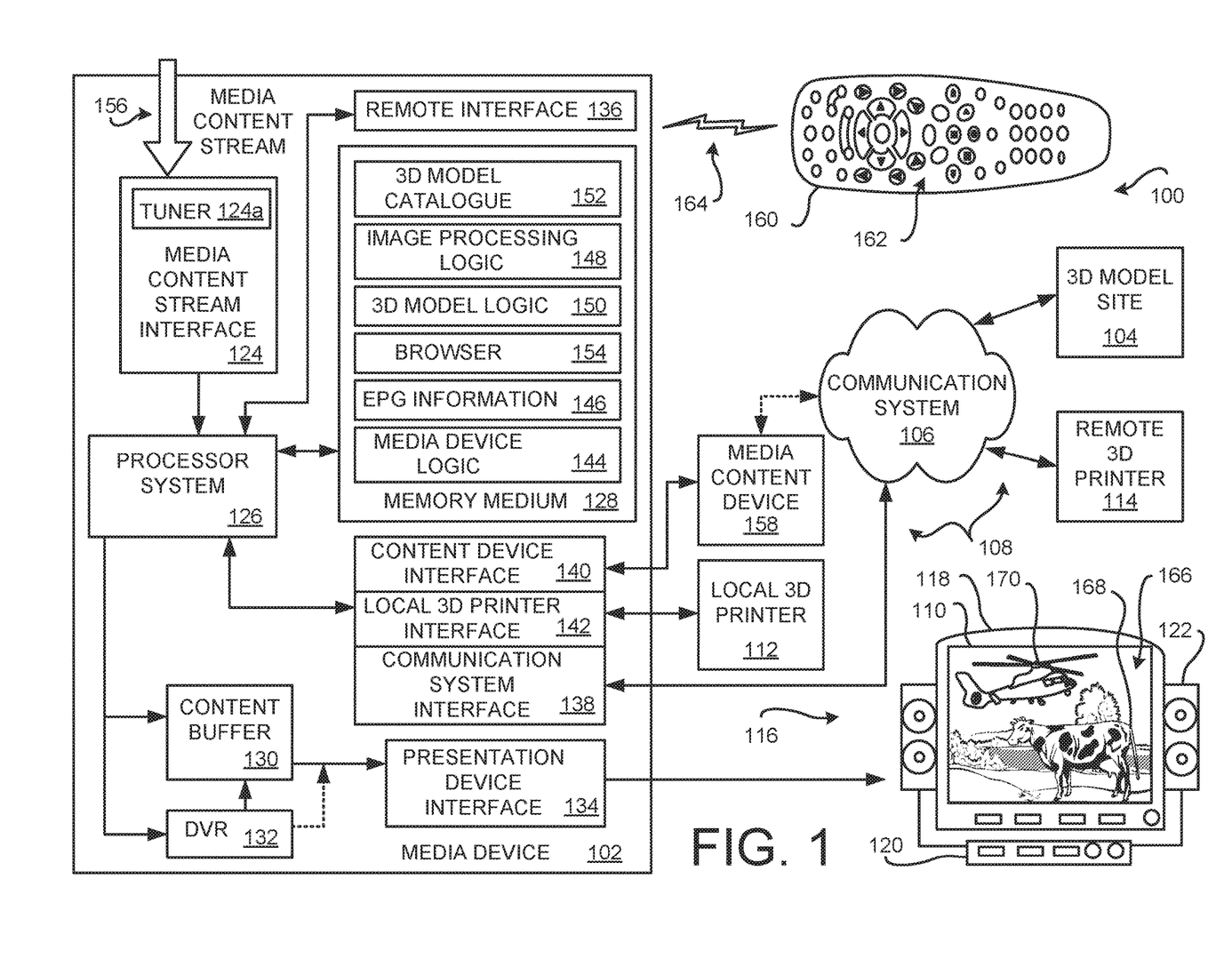
FIG. 1 is a block diagram of an embodiment of a three dimensional (3D) model data generation system.

FIG. 1 is a block diagram of an embodiment of a three dimensional (3D) model data generation system 100. Embodiments of the 3D model data generation system 100 may be wholly or partially implemented in a media device 102, such as, but not limited to, a set top box (STB). Embodiments of the 3D model data generation system 100 may be implemented in other media devices, such as, but not limited to, a stereo, a surround-sound receiver, a radio, a television (TV), a digital video disc (DVD) player, a digital video recorder (DVR), a game playing device, or a personal computer (PC). Alternatively, embodiments of the 3D model data generation system 100 may be wholly or partially implemented at a remote site, hereinafter referred to as the remote 3D model site 104. The remote 3D model site 104 is communicatively coupleable to a plurality of media devices 102 via a communication system 106. Communication links 108 may be established on an as-needed basis and/or may be permanent communication links. The communication links 108 may employ wire-based connection and/or may employ wireless-based technologies.

The communication system 106 is illustrated as a generic communication system. In one embodiment, the communication system 106 comprises a cellular telephone system, such as a radio frequency (RF) wireless system. Accordingly, the media device 102 and the remote 3D model site 104 include a suitable transceiver operable to communicate via such wireless systems. Alternatively, the communication system 106 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 and/or the remote 3D model site 106 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 and/or the remote 3D model site 106 may be configured to communicate over combination systems having a plurality of segments which employ different formats for each segment of a communication link 108 that employ different technologies on each segment.

One skilled in the arts appreciates that any particular physical object of interest is discernible by the user of the media device 102 in the video portion of one or more scenes of the media content event. Embodiments of the 3D model data generation system 100 are configured to employ passive modeling techniques to generate 3D model data that is printable using a 3D printer. That is, the generated 3D model corresponds to a physical object of interest that has been seen in a media content event by a user who is viewing a display 110 that is presenting the video portion of the media content event. In a media content event, no controlled light sources are used to illuminate a physical object with a lined pattern. Cameras are not calibrated to any particular degree of accuracy, and/or if such calibration is known, such calibration information is typically not available in a stream of media content event data that is available to be viewed by the user. Further, precise location of the camera in 3D space is not known. Accordingly, depth attributes of the various portions of a particular physical object of interest must be determined based on analysis of selected individual video frames of the media content event based on 3D passive modeling techniques.

In some situations, the camera (interchangeably referred to herein as a video image capture device, or simply, as an image capture device) may be moving about the physical object of interest that is stationary, or that is substantially stationary, during the filming of the scene of the media content event. Alternatively, or additionally, the camera may be stationary, or may be substantially stationary, during the filming of the scene while the physical object of interest is moving (and/or while other filmed physical objects are moving). It is appreciated by one skilled in the art that both the camera and the physical object of interest may be moving during the filming of the scene.

Regardless of the movement by the camera and/or the physical object of interest, the video portion of the filmed scene comprises a series of sequentially ordered video image frames. When the series of video image frames are each sequentially presented to the viewer on a display 110, the viewer perceives a video of the filmed scene.

In practice, a particular media device 102 is operated by a user to present the media content event. During presentation of the media content event, the media device 102 receives a user request associated with an interest on the part of the user to acquire a printed 3D object. Accordingly, the media device 102 receives the user request at a time that substantially corresponds to presentation of a particular viewed physical object of interest in the currently presenting scene of the media content event. In response to receiving the user's request, embodiments of the 3D model data generation system 100 are configured to identify the particular viewed physical object of interest that the user is interested in. That is, the viewing user sees an image of a physical object of interest that they would like to obtain a corresponding printed 3D object of, notifies the media device 102 using a request, and then the viewed physical object of interest is identified from one or more video image frames that are currently presenting or were being presented at the time that the user request was generated.

A particular challenge solved by embodiments of the 3D model data generation system 100 is to ensure that the physical object of interest is correctly identified from at least one of a plurality of video image frames selected from the scene that is currently being presented to the user. Typically, each video image frame includes images of a plurality of different physical objects. Thus, embodiments of the 3D model data generation system 100 are configured to discern the various physical objects (referred to herein interchangeably as candidate physical objects) being shown in the media content event at the time that the user request was received (or at least corresponding to the time that the user request was received in view of processing time required to process the user request and access a particular video image frame). A physical object of interest is then identified from among the various discerned candidate physical objects.

Once the physical object of interest has been identified, 3D printable model data can then be generated based on an analysis of the physical object of interest that is being shown in the selected scene. Since embodiments of the 3D model data generation system 100 employ passive modeling techniques to generate 3D printable model data, a plurality of video image frames are selected from the scene such with a sufficient degree of apparent movement in the object of interest. The apparent movement of the image of the physical object of interest results when the physical object of interest is filmed from a different viewpoint during the scene. The different viewpoints of the filming of the physical object of interest results in an apparent movement of the physical object of interest (either from camera movement and/or movement of the physical object of interest). Assuming that there is a sufficient number of different viewpoints of the object of interest taken during the scene, depth attributes of the various portions of the physical object of interest can be determined from the selected video image frames to enable generation of a 3D model using passive modeling techniques.

Any suitable passive modeling technique now known or later developed that is configured to generate 3D printable model data may be used by various embodiments of the 3D model data generation system 100. The unique problems solved by the various embodiments of the 3D model data generation system 100 include, but are not limited to, obtaining a sufficient number of still images of the physical object of interest that have a sufficient variation in viewpoints of the physical object of interest. Accordingly, embodiments of the 3D model data generation system 100 are configured to, after identification of the physical object of interest from among the various candidate physical objects, identify the physical object of interest from the video image frames (the still images that comprise the video portion of the media content event).

In some situations, the images of the physical object of interest is shown intermittently during the scene of the media content event. For example a particular scene may be comprised of a series of shorter video clips captured by different video cameras. It is possible that images captured by a first video camera includes an image of the physical object of interest while the images captured by a second video camera omits the physical object of interest. Thus, embodiments of the 3D model data generation system 100 are configured to select individual video frames from a scene that include all of or at least a part of the physical object of interest.

Accordingly, video image frames from the selected scene are periodically selected. Here, one skilled in the arts appreciates that each video image frame of a media content event are separated by a predefined duration and are serially sequenced with respect to each other. For example, four to twenty four video image frames, or even more video image frames, may be shown each second (wherein each video image frame is sequentially presented in order for a predefined duration). Embodiments of the 3D model data generation system 100 initially select a plurality of video image frames from the scene based upon some predefined separation duration that is expected to provide a different viewpoint of the physical object of interest.

In an example embodiment, a predefined number of video image frames separated by an initial predefined duration are selected. For example, five video image frames separated by approximately one second (a one second sampling duration) may be selected, thus spanning approximately five seconds in the filmed scene. Any suitable number of video image frames may be initially selected, and any initial video image frame separation duration may be used.

Each of the initially selected video image frames are analyzed to identify the object of interest from the other objects also shown in the video image frame. Any suitable image object recognition algorithm may be used in the various embodiments.

A first problem encountered during this initial analysis process is that not all of the selected video image frames may contain an identifiable image of the physical object of interest. Returning to the above simplified hypothetical example of five initially selected video image frames, it may be that all five selected video image frames include the physical object of interest. However, it is also possible that only one of the selected five video image frames have the physical object of interest. One skilled in the arts appreciates that no meaningful 3D model data can be developed from a single image. Accordingly, embodiments of the 3D model data generation system 100 compare the initial number of different identified images of the physical object of interest with a predefined number threshold. If the number of images of the physical object of interest exceeds the number threshold, then an analysis can be performed to determine if there is a sufficient difference in the image capture viewpoint between each of the physical object of interest images.

However, if the initial number of identified images of the physical object of interest is less than the number threshold, additional images of the physical object of interest are needed. Accordingly, additional video image frames from the scene are selected. One or more video image frames preceding the initially selected video image frames may be selected, video image frames following the initially selected video image frames may be selected, and/or video image frames on either side of the initially selected video image frames may be selected. The number of video image frames subsequently selected may be based on a minimum number of images of the physical object of interest such that video image frame selections continue until at least a minimum number of images of the physical object of interest have been obtained. Alternatively, video image frames may be selected based on some predefined duration, such as another five seconds or so. Any suitable subsequent selection duration may be used.

Once a sufficient number of images of the physical object of interest have been identified in the initially selected (or other subsequently selected) video image frames, embodiments of the 3D model data generation system 100 analyze one or more attributes of each image of the object of interest to determine if there is a sufficient variation in the viewpoint so that a meaningful analysis of the images can be conducted so as to determine the depth attributes of the various portions of the physical object of interest. For example, one or more vertices (an identifiable point location in 3D space) may be computed for a plurality of unique different portions of features, objects or points shown in the image of the physical object of interest. One skilled in the art appreciates that 3D models can be defined using a plurality of non-uniform rational B-spline (NURBS) smooth surfaces with control vertices or a polygonal model that employs geometric polygonal faces that are defined by edges where two faces meet and vertices where at least two edges meet. Thus, each defined vertex uniquely corresponds to a location point on the physical object of interest.

The vertices are determined for each of the initially selected (or other subsequently selected) video image frames. If there is a sufficient degree of change in the position of the identified vertices between video image frames, then one skilled in the arts appreciates that it may be possible to have enough apparent movement in the physical object of interest so that a 3D model can be generated based on passive modeling techniques.

For example, if the camera and or the physical object of interest are moving during the film scene, then a one second separation between selected images of the physical object of interest may provide a sufficient variation in variation in the images of the physical object of interest. Accordingly, embodiments of the 3D model data generation system 100 can then continue sampling additional video image frames from the scene so as to obtain a larger number of images of the physical object of interest for 3D model generation.

However, it is also possible that the change in position between the one or more vertices is not sufficient to provide any meaningful analysis of the physical object of interest. For example, the scene may include images of a stationary physical object of interest taken by a camera that in not moving. One skilled in the arts appreciates that no matter how many images of the physical object of interest are acquired during this portion of the scene, the absence of apparent movement of the physical object of interest will preclude 3D model data generation using passive modeling techniques. Accordingly, embodiments of the 3D model data generation system 100 are configured to solve this unique problem in a variety of manners. A first solution is to resample the video image frames using an increased separation duration. For example, instead of an initial sampling duration of one second, the sampling duration may be increased to five seconds. The above-described analysis may then be repeated so as to determine if a sufficient amount of apparent movement in the object of interest can be obtained from the scene so as to enable generation of a 3D model using passive modeling techniques.

Once a video image frame sampling duration is determined (such that a sufficient apparent movement in the object of interest is obtained between successive sampled video image frames), the video image frames from the scene may be sampled to obtain a plurality of images of the physical object of interest. Since it is highly probable that the physical object of interest has been filmed during all of or a substantial part of the scene during which the initial user request was received, one skilled in the arts appreciates that it is preferable to select video image frames for analysis from that particular scene of the media content event. Accordingly, embodiments of the 3D model data generation system 100 are configured to discern scenes of the media content event from each other. That is, embodiments are configured to identify a beginning of a scene and an end of the scene. Then, video image frames likely to have the physical object of interest filmed therein can be sampled. Some media content event include scene description information in the associated metadata. Changes in audio or video characteristics may be used to identify scene transitions. For example, a significant change in image vectors, colors, and/or color palette information my be an indication of a scene transition from one scene to the next. Any suitable process of determining a scene beginning and ending may be used by the various embodiments.

If a sufficient number of images of the physical object of interest have been acquired over the duration of the scene, and if a sufficient amount of apparent movement of the physical object of interest is available, generation of the 3D model data can be initiated. However, it is possible in some situations that the number of images and/or the degree of apparent movement in the object of interest is not sufficient to permit a generation of 3D mode data. In such situations, embodiments of the 3D model data generation system 100 may access video image frames from different scenes of the media content event.

Some embodiments may be configured to analyze the metadata of the media content of interest. Accordingly, embodiments of the 3D model data generation system 100 are configured to identify and associate a name or other identifying information with the identified physical object of interest. Description information in the metadata may indicate whether the physical object of interest is included in that particular scene using a description of the physical object of interest and/or the name associated with the physical object of interest. For example, if the object of interest is an actor or an animated character, scene description information may indicate that the actor or animated character is participating in that scene, and is therefore likely to have been filmed during that scene. Alternatively, or additionally, the text of the closed captioning text may identify the physical object of interest. For example, the name of the actor or animated character may be included in the closed captioning text. When embodiments of the 3D model data generation system 100 identify a scene with information that corresponds to the physical object of interest, video image frames can be sampled from that scene.

Alternatively, or additionally, embodiments may be configured to randomly and/or periodically sample video frames from the media content event. The sampled video frames can be analyzed to determine if the physical object of interest was filmed in that sampled video frame. The sampling may continue until the physical object of interest is identified in a sampled video image frame. Once the object of interest is identified, then video image frames from that scene may be accessed and analyzed so as to obtain images of the physical object of interest.

One skilled in the arts appreciates that a single scene of the media content event may not provide sufficient image views of the physical object of interest to permit generation of accurate or reliable 3D model data of the physical object of interest. Accordingly, embodiments of the 3D model data generation system 100 are configured to obtain additional views of the identified physical object of interest from other scenes of the media content event as described herein.

Alternatively, or additionally, embodiments of the 3D model data generation system 100 may configured to obtain additional views of the identified physical object of interest from other media content events. For example, the description of the physical object of interest and/or the name associated with the physical object of interest may be determinable. Media content event descriptor information may be accessed for other media content events to determine if the physical object of interest was filmed in that particular media content event. Alternatively, or additionally, legacy cataloguing systems have already identified and associated a plurality of different media content events with a particular object of interest. For example, if the physical object of interest is a notoriously well-known actor or animated character, such catalogue systems may be accessed by embodiments of the 3D model data generation system 100 to obtain the identity of other media content events that included that actor or animated character. Then, those different media content events can be accessed and sampled video image frames can be analyzed to identify the physical object of interest. Accordingly, a sufficient number of images of the physical object of interest can be obtained with a sufficient variety of viewpoints so that the 3D model data generation system 100 can determine depth attributes of the various portions of the physical object of interest using passive modeling techniques.

Alternatively, or additionally, additional images of the object of interest may be obtained from other resources such as image files or the like. Such additional images of the physical object of interest are defined herein as supplemental images of the physical object of interest. The supplemental images of the physical object of interest are stored in a memory medium that can be accessed by the media device 102 and/or the 3D model site 104. Here, the name of the physical object of interest, or other identifying information of the physical object of interest, may be used to search a plurality of other resources that have stored supplemental images of the physical object of interest. For example, if the name of the actor or animated character (who is the physical object of interest) is known, a library or catalogue of stock photos (still images) stored in a memory medium may be accessed. These accessed images may be used in the generation of the 3D model data. The memory medium that stores the supplemental images of the physical object of interest may reside in, or may be remote from, the media device 102 and/or the remote 3D model site 104.

In some instances, the other sources that provide image information pertaining to the physical object of interest may have characteristic that differ from the particular characteristics of the object of interest as filmed in the media content event. For example, the physical object of interest may have a particular color or other characteristic in the media content event. However, the coloring or the like of the physical object of interest identified in other media content events or other accessed images may be different. For example, if the physical object of interest is a particular make and model of an automobile that is colored red, the same make and model of automobile in other media content events or accessed images may be of a different color. In this situation, embodiments of the 3D model data generation system 100 are configured to obtain depth attributes of the various portions of the physical object of interest from the images obtained from these other sources, and then modify the obtained 3D model data to correspond with the particular characteristics of the physical object of interest being shown in the media content event. Here, the color of the automobile may be specified after all images have been analyzed to define the depth attributes of the various portions of the automobile.

Once the 3D printable model data has been generated based upon the sampled video image frames of the media content event by embodiments of the 3D model data generation system 100, the 3D printable model data may then be communicated to a suitable local 3D printer 112 or to a suitable remote 3D printer 114. The 3D printer 112, 114 may then manufacture a printed 3D object based on the generated 3D printable model data.

To facilitate an explanation of embodiments of the 3D model data generation system 100, an example non-limiting media device 102 embodied with all of or a portion of the 3D model data generation system 100 is conceptually illustrated in FIG. 1 and is broadly described. The simplified conceptual exemplary media device 102 is communicatively coupled to a media presentation system 116 that includes a visual display device 118, such as a television (hereafter, generically a TV), and an audio presentation device 120, such as a surround sound receiver controlling an audio reproduction device. The video portion of the media content event is presented to a user on the display 110 of the visual presentation device 118 The audio portion of the media content is reproduced as audible sounds by one or more speakers 122 of the audio presentation device 120. Other types of output devices may also be coupled to the media device 102, including those providing any sort of stimuli sensible by a human being, such as temperature, vibration and the like. In some embodiments, the media device 102 and one or more of the components of the media presentation system 116 may be integrated into a single electronic device. Such an example integrated device is a smart phone, a cellular phone, a laptop computer, a desktop computer, a gaming device or the like.

The non-limiting exemplary media device 102 comprises a media content stream interface 124, a processor system 126, a memory medium 128, a content buffer 130, an optional digital video recorder (DVR) 132, a presentation device interface 134, a remote interface 136, a communication system interface 138, a content device interface 140 and an optional local 3D printer interface 142. The memory medium 128 comprises portions for storing the media device logic 144, the electronic program guide (EPG) information 146, image processing logic 148, 3D model logic 150, an optional 3D model catalogue 152, and an optional browser 154. In some embodiments, the media device logic 144, the image processing logic 148, the 3D model logic 150, and/or the optional browser 154 may be integrated together, and/or may be integrated with other logic. In other embodiments, some or all of these memory and other data manipulation functions may be provided by using a remote server or other electronic devices suitably connected via the Internet or otherwise to a client device. Other media devices 102 may include some, or may omit some, of the above-described media processing components. Further, additional components not described herein may be included in alternative embodiments.

In a satellite broadcast system, a media content provider provides media content that is received in one or more media content streams 156 multiplexed together in one or more transport channels. The transport channels with the media content streams 156 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 156 include a cable system, a radio frequency (RF) communication system, and the Internet.

The one or more media content streams 156 are received by the media content stream interface 124. One or more tuners 124a in the media content stream interface 124 selectively tune to one of the media content streams 156 in accordance with instructions received from the processor system 126. The processor system 126, executing the media device logic 144 and based upon a request for a media content event of interest specified by a user, parses out media content associated with the media content event of interest that is being received in the media content stream 156. The media content event of interest is then assembled into a stream of video and/or audio information which may be stored by the content buffer 130 such that the media content event can be streamed out to components of the media presentation system 116, such as the visual display device 118 and/or the audio presentation device 120, via the presentation device interface 134. Alternatively, or additionally, the parsed out media content may be saved into the DVR 132 for later presentation. The DVR 132 may be directly provided in, locally connected to, or remotely connected to, the media device 102. In alternative embodiments, the media content streams 156 may be stored for later decompression, processing and/or decryption.

In some situations, the media content event may be received from an electronic media content device 158 that is communicatively coupled to the media device. The media content event is stored is a suitable memory medium (not shown) that can be accessed by the media device 102. An example media content device 158 is a digital video disc (DVD) player that is configured to access a media content event that has been stored on a DVD. The DVD content is streamed to the media device 102 via the content device interface 140. Another exemplary media content device 158 is a uniform serial bus (USB) flash memory that accesses the media content from a flash memory medium. Here, the content device interface 140 would be a suitable USB port that is configured to receive the USB flash drive. Another example media content device 158 is a cell phone or smart phone that is operable to communicate the media content event wirelessly. Here, the content device interface 140 may be a suitable transceiver. Alternatively, or additionally, the media content device 158 may be remotely located such that the media device 102 communicatively couples to the media content device 158 via the communication system 106. Any suitable media content device 158 that is configured to communicatively couple to the media device such that a media content event can be accessed for image analysis are contemplated by the various embodiments of the 3D model data generation system 100.

From time to time, information populating the EPG information 146 portion of the memory medium 128 is communicated to the media device 102, via the media content stream 156 or via another suitable media. The EPG information 146 portion of the memory medium 128 stores the information pertaining to the scheduled programming of a plurality of media content events that are scheduled for current and future broadcasting. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the media content event's supplemental information. The information about the media content event is used by embodiments of the 3D model data generation system 100 to identify the particular media content event that has the images of the physical object of interest that has been identified by the user who is viewing the currently presenting media content event. Based on the identifying information, the media content event may be accessed from one or more sources so that the video image frames of one or more scenes of can be selected and analyzed.

The exemplary media device 102 is configured to receive commands from a user via a remote control 160. The remote control 160 includes one or more controllers 162 disposed on the surface of the remote control 160. The user, by actuating one or more of the controllers 162, causes the remote control 160 to generate and transmit commands, via a wireless signal 164, to the media device 102. Preferably, each individual one of the controllers 162 has a specific predefined function that causes a specific operation by the media device 102 and/or by components of the media presentation system 116. The commands communicated from the remote control 160 then control the media device 102, control components of the media presentation system 116, and/or control the process of generating 3D printable model data by embodiments of the 3D model data generation system 100. The wireless signal 164 may be an infrared (IR) signal or a radio frequency (RF) signal that is detectable by the remote interface 136. An exemplary remote control includes a dedicated controller 162 with the predefined function that generates the user request for a printed 3D object of a particular physical object of interest being currently shown on the display 110. Thus, while viewing the media content event, the user simply needs to actuate the dedicated one of the controllers 162 to initiate the process of generating 3D model data.

The processes performed by the media device 102 relating to the processing of the received media content stream 156 and communication of a presentable media content event to the components of the media presentation system 116 are generally implemented by the processor system 126 while executing the media device logic 144. Thus, the media device 102 may perform a variety of functions related to the processing and presentation of one or more media content events that are being received in the media content stream 156, that are being received from the DVR 132, and/or that are being received from another source such as the media content device 158.

Figure 2:
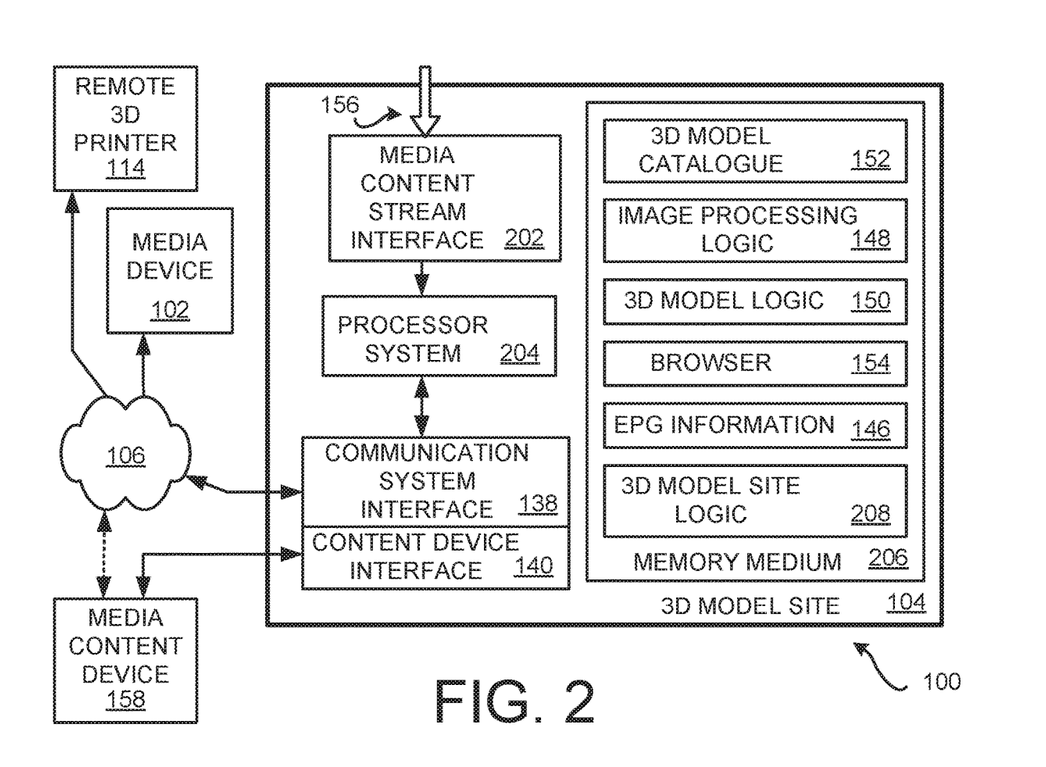
FIG. 2 is a block diagram of a 3D model site embodied with all of, or a portion of, the 3D model data generation system.

FIG. 2 is a block diagram of a 3D model site 104 embodied with all of, or a portion of, the 3D model data generation system 100. The non-limiting exemplary 3D model site 104 comprises a media content stream interface 202, a processor system 204, a memory medium 206, a communication system interface 138, and an optional content device interface 140. The memory medium 206 comprises portions for storing the 3D model site logic 208, EPG information 146, an optional browser 154, 3D model logic 150, image processing logic 148, and an optional 3D model catalogue 152. In some embodiments, the 3D model site logic 208, the image processing logic 148, the 3D model logic 150, and/or the optional browser 154 may be integrated together, and/or may be integrated with other logic. In other embodiments, some or all of these memory and other data manipulation functions may be provided by using a remote server or other electronic devices suitably connected via the Internet or otherwise to a client device. Other 3D model sites 104 may include some, or may omit some, of the above-described media processing components. Further, additional components not described herein may be included in alternative embodiments.

With respect to the like numbered elements described herein for the media device 102, these like numbered elements perform similar functions as described for the media device 102. One skilled in the art appreciates that the particular like numbered elements of any particular 3D model site 104 and media device 102 may be the same, nearly the same, or only similar in actual configuration. Such similarities and/or differences between the like numbered elements of the 3D model site 104 and the media device 102 can be accommodated without departing from the functionality provided by the various embodiments of the 3D model data generation system 100. Accordingly, such like numbered elements are described only to the extent needed to teach one skilled in the art how to make, use and practice embodiments of the 3D model data generation system 100.

To facilitate an explanation of the operation of embodiments of the 3D model data generation system 100, FIG. 1 conceptually illustrates a hypothetical scene 166 of a media content event that is being presented to the user (not shown) on the display 110. This hypothetical scene presents an image of a countryside landscape with a lake and trees, with an image of a cow 168 in the foreground, and an image of a helicopter 170 in the background apparently hovering above the cow 168. Here, the user is hypothetically assumed to be a small child. At some point during presentation of the media content event (such as at the time of the presented scene 166), the child user decides that they wish to have a printed 3D object of the cow 168 and/or of the helicopter 170 to play with. Accordingly, during presentation of the scene 166, the child user (or an adult who is with the child) actuates the associated controller 162 to initiate the process of obtaining 3D model data that can be used to print the viewed physical object of interest.

A unique problem solved by embodiments of the 3D model data generation system 100, with respect to the above-described hypothetical example, is to determine which of the various physical objects that are viewable in a currently presented scene is of interest to the user. Here, embodiments of the 3D model data generation system 100 resolve the question of where the child user is interested in obtaining a printed 3D object of the cow 168, the helicopter 170, or another physical object that is viewable in the presented scene 166.

Embodiments of the 3D model data generation system 100, in response to receiving the user request, select one of the video frames of the media content event that is currently being shown, or that was being shown, when the user generated their request. Since the content buffer 130 temporarily stores the data used to render the plurality of video frames on the display 110, the processor system 126 selects and retrieves the image data for analysis from the content buffer 130. Alternatively, the video frame data that is currently being communicated out from the presentation device interface 134 can be selected for analysis. Alternatively, if the media content event is being provided by the DVR 132 or another memory medium, the video image frame can be selected the memory medium where the media content event resides. Video image frames are identifiable by a presentation time that is associated with each video image frame. Accordingly, at the time that the user request is received, the presentation time is accessed and/or is determined such that the associated video image frame data can be accessed and analyzed.

It is appreciated by one skilled in the art that the data of an video image frame may be provided in a variety of formats. For example, video image frame data may be available in one of the well-known moving pictures expert group (MPEG) formats. Under this various MPEG formats, image data for a frame may be complete (known in the arts as an I-frame, an intra-frame, a key frame or the like) such that the entirety of the image of that video image frame may be rendered (reproduced for presentation). However, some video image frame data may be partially complete, and require data from nearby video image frames for completion (known in the arts as P-frame or a predicted frame, a B-frame or a backwards-predicted frame, or the like). Thus, an example embodiment initially identifies the video image frame that corresponds to the user's request, and then accesses the image data for that video image frame. If the video image frame data is incomplete, then other video image frames with the complete image data are selected such that the entirety of the image data is obtained. For example, an I-frame in proximity to the incomplete data video image frame associated with the initial user request may be selected. Alternatively, if the data is incomplete for the selected video image frame (such as a P-frame or B-frame), then data from a nearby complete video image frame (such as the associated I-frame) can be selected and accessed so that the complete video image frame data can be reconstructed for analysis.

Once complete data for an video image frame has been obtained, embodiments of the 3D model data generation system 100 analyze the image to discern and identify physical objects that are presented (are viewable) in portions of the image of the selected video image frame. The processor system 126, 204 executing the image processing logic 148, then processes the image data to identify at least one physical object.

For example, a physical object may be identified based on a plurality of identified edges in the image. Edges may be joined to identify an outline of an object. Alternatively, or additionally, a physical object may be identified based on colors and/or a transition from one color to another color of the background objects. An object may be composed substantially of one color and backgrounds or other objects may have different colors. Areas may be identified that have the same, or substantially the same, color and the extents identified based on a transition from the object's color to a different color. Any suitable image object recognition algorithm now known or later developed may be used by the various embodiments to identify and discern images of physical objects shown in a video image frame.

Returning to the hypothetical example, one skilled in the art appreciates that the image of the cow 168 and the image of the helicopter 170 are readily identifiable from the presented scene 166. The cow 168 and the helicopter 170 are appreciated by one skilled in the art to be likely candidate physical objects of interest that are suitable for manufacture as a printed 3D object because the relative size of these objects in the scene are relatively large, and because the extent (boundaries) of these objects are discernible in the video image frame. That is, the size of the cow 168 and the helicopter 170 in the scene 166 are both relatively large, and their boundaries are readily identifiable in the scene 166 of the analyzed video image frame.

In contrast, other objects such as the lake or trees shown in the background landscape are not particularly well suited for manufacture as a printed 3D object because of their relative size is small and/or the extent (boundary) of these objects are not readily identifiable. Accordingly, embodiments of the 3D model data generation system 100 would not identify these types of objects as being suitable candidate objects of interest because their size is small and/or because their extents cannot be determined.

Accordingly, embodiments of the 3D model data generation system 100 initially identify a plurality of physical objects in the image of the selected video image frame. Then, the identified physical objects are further analyzed to identify at least one potential candidate physical object of interest that the user is likely to be interested in. One or more various techniques may be utilized by embodiments of the 3D model data generation system 100 to identify potential candidate physical objects of interest from other physical objects that are identifiable in the analyzed video image frame.

A first technique is to determine the relative size of an identified physical object. If the size of an identified physical object exceeds a threshold size, then the identified physical object may be considered as a potential candidate physical object of interest. For example, the number of pixels in the image may be determined and then compared with a pixel number threshold. Since a relative size of a pixel is determinable, one skilled in the arts appreciates that the number of pixels associated with a viewable physical object can be associated with the relative size of the associated physical object shown in the video image frame. If the number of pixels used to render the identified physical object exceeds the pixel number threshold, the identified physical object may be determined to be a potential candidate physical object of interest.

Alternatively, or additionally, an area of the identified physical object may be determined. The determined area associated with the physical object can be compared with an area threshold. If the area used to render the identified physical object in the image exceeds the area threshold, the identified physical object may be determined to be a potential candidate physical object of interest.

Alternatively, or additionally, a ratio of the area of the identified physical object to the area of the image may be determined. The ratio may then be compared with a ratio threshold. If the area ratio used to render the identified physical object in the image exceeds the ratio threshold, the identified physical object may be a potential candidate physical object of interest. For example, if the ratio threshold is equal or greater than ten percent of the area of the video image frame, then object may then be identified as a candidate object of interest.

Alternatively, or additionally, the extents (boundaries) of the identified physical object may be determined. If the extent of the physical object in the image is readily identifiable and/or is complete, the identified physical object may be a potential candidate physical object of interest. Here, the identified extents may be compared with a plurality of stored object outlines. For example, if the user is interested in the cow 168, the extent of the image of the cow shown in the video image frame can be recognized as correlating with an outline of a mammal that corresponds to cow-like mammals.

Returning to the hypothetical example, one skilled in the art appreciates that the cow 168 and the helicopter 170 can be identified as being potential candidate physical objects of interest. Their size in the video image frame is relatively large and their extents are readily identifiable. In contrast, one skilled in the arts appreciates that the lake and trees in the background landscape are not likely to be identified as being potential candidate physical objects of interest because their relative size is small and/or since their extents cannot be readily determined.

Once at least one potential candidate physical object of interest has been identified, embodiments of the 3D model data generation system 100 are configured to present information showing and/or describing the one or more identified candidate physical objects of interest to the user. Embodiments are further configured to receive an acknowledgement or confirmation from the user that the potential candidate physical object of interest is to be identified as the physical object of interest for which 3D model data is to be generated. If a plurality of potential candidate physical objects of interest are identified from the analyzed video image frame, then embodiments are configured to receive a selection of one or more of the potential candidate physical objects of interest from the user. The selected one or more potential candidate physical objects of interest may then be identified as physical object of interests in the video image frame for which 3D model data is to be generated.

Figure 3:
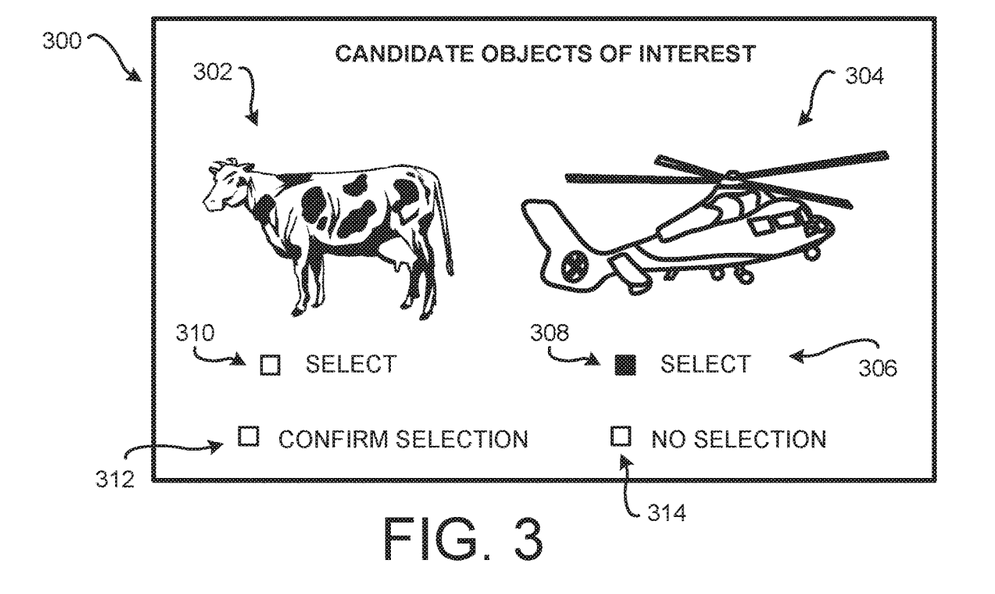
FIG. 3 is an example presented user confirmation image that is used to indicate to the user the potential candidate physical objects of interest that have been identified from an analyzed video image frame.

FIG. 3 is an example presented user confirmation image 300 that is used to indicate to the user the potential candidate physical objects of interest that have been identified from an analyzed video image frame. The user confirmation image 300 may be presented to the user on the display 110 or on another suitable display. After the user has made their selection of a particular one of the potential candidate physical objects of interest indicated on the user confirmation image 300, the selected potential candidate physical objects of interest may be defined as a physical object of interest for which 3D model data is to be generated. That is, the media device 102 receives the user response that is associated with the candidate physical object, wherein the user response indicates that the candidate physical object is the physical object of interest that the user is interested in, or wherein the user response indicates that the candidate physical object is not the physical object of interest that the user is interested in.

The hypothetical user confirmation image 300 presents an image 302 of the cow 168 and an image 304 of the helicopter 170. Here, the viewing user intuitively understands that two potential candidate physical objects of interest (the cow 168 and the helicopter 170) have been identified in the analyzed video image frame that was selected in response to the user's initial request. Proximate to the image of each identified potential candidate physical object of interest is a region 306 that is associated with each identified potential candidate physical object of interest. Suitable text may be presented to indicate to the user that the nearby potential candidate physical object may be selected.

In some embodiments, an active region adjacent to the text is provided on the user confirmation image 300 such that the user may navigate to and make their selection of one or more of the indicated candidate physical objects. Such navigation may be effected by the remote control 160 (FIG. 1) using processes that are similar to those used to navigate about a presented EPG.

Selection regions 308 and 310 may be associated with the images 304 and 302 respectively to facilitate the user's selection. Returning to the hypothetical example, the user has apparently selected the helicopter 170 for 3D model data generation, as indicated by the black shading of the selection region 308. Since the selection region 310 has not apparently been selected by the user (since the selection region 310 is shown with white shading), the cow 168 has not been selected in the user confirmation image 300.

Once a user has selected one or more of the identified potential candidate physical objects, as indicated in the received user response, an optional region 312 presented on the user confirmation image 300 may be shown so that the user may confirm their selection. (Alternatively, the user's selection of one of the identified potential candidate physical objects may be used as a confirmation of the user's selection.) If the user is not interested in any of the identified potential candidate physical objects indicated in the user confirmation image 300, they may select the optional selection region 314 such that the user response indicates that none of the identified potential candidate physical objects are selected to become a physical object of interest for which 3D model data is generated based on images of that particular physical object in the media content event.

It is appreciated by one skilled in the arts that the user confirmation image 300 is a non-limiting hypothetical example of presentation of identified potential candidate physical objects that may be considered by the user. Any suitable configuration for the user confirmation image 300 may be used by the various embodiments. Any suitable text and/or selection means may be used. Sizes of the user confirmation image 300 and/or the images of the identified potential candidate physical objects may be adjusted as necessary to enable a meaningful review and selection of the identified potential candidate physical objects by the user. In some situations, only a single identified potential candidate physical object is identified in an analyzed video image frame. Accordingly, only a single image of the identified potential candidate physical object may be indicated in the user confirmation image 300, and the user only needs to confirm that they are interested in that particular identified potential candidate physical object.

Embodiments of the 3D model data generation system 100 may be configured to pause presentation of the media content event during presentation of the user confirmation image 300. After the user has completed their selection among the various presented potential candidate physical objects, presentation of the user confirmation image 300 may be concluded and presentation of the media content event may be resumed.

Alternatively, the user confirmation image 300 may be a relatively small image that is presented over the continuing presentation of the media content event using a picture in picture, picture over picture, or other similar format. Thus, presentation of the media content event is not interrupted while the user confirmation image 300 is presented. After the user has completed their selection among the various presented potential candidate physical objects, presentation of the user confirmation image 300 may be concluded.

Alternatively, or additionally, the user confirmation image 300 may be presented on another display such that presentation of the media content event is not interfered with and/or is not interrupted. For example, but not limited to, the remote control 160 may have a display on its surface that is used to present the user confirmation image 300. Alternatively, or additionally, the user confirmation image 300 may be presented on the display of a personal electronic device, such as a cell phone, note pad, lap top computer, or the like.

Alternatively, some embodiments may be configured to present the user confirmation image 300 after the conclusion of presentation of the media content event. Accordingly, presentation of the media content event is not interfered with and/or is not interrupted. Further, if the user has made multiple user requests during presentation of the media content event, all potential candidate physical objects that have been identified in a plurality of different scenes may be presented at a single time for user selection. In some embodiments, only those potential candidate physical objects that have been identified in multiple scenes presented at different times are presented to the user in the user confirmation image 300. Thus, the multiple user requests of the same identifiable physical object may be used to reduce the number of identified potential candidate physical objects that are indicated in the user confirmation image 300.

Once the user has selected one or more identified potential candidate physical objects, embodiments of the 3D model data generation system 100 then analyze images of the media content event to generate 3D model data for the selected physical object of interest seen by the user in the presenting media content event. It is appreciated that presentation of a media content event to the user is a continuing process wherein a stream of still images (video frames) are sequentially presented to the user over time such that the user perceives a moving video.

A unique problem arises in the arts once a user has initiated generation of 3D model data based on an image that they have viewed during presentation of the media content event. After the user actuates one of the controllers 162 on their remote control 160 or generates the user request using another device, presentation of the currently presenting scene continues for at least some duration while the potential candidate physical objects are identified in an analyzed video image frame. (Alternatively, presentation of the media content event may be paused in response to the user request.) With continuing presentation of the media content event, when presentation of the scene showing the physical object(s) of interest has concluded, presentation of the next scene of the media content event begins. Thus, a stream of video image frames (the video data) are communicated out from the content buffer 130 through the presentation device interface 134 for presentation on the display 110.

Content buffers 130 typically have a limited data storage capacity. Accordingly, at some point as the media content event is being streamed out from the content buffer 130, previously presented video image frame data is overwritten or is otherwise deleted from the content buffer 130 to accommodate new video image frame data for the video image frames that are to be next presented on the display 110. Accordingly, data for a limited amount of video image frames are available from the content buffer 130 for analysis. The problem becomes even more significant if previously buffered portions of the presenting media content have been overwritten such that the beginning portion of the scene is not available for analysis. That is, an insufficient amount of video image frame data may be stored in the content buffer 130 so that a reliable and accurate 3D model can be generated there from.

Further, other scenes of the media content event and/or image data from other sources may be needed so that a complete and/or better 3D model can be generated by embodiments of the 3D model data generation system 100. Image data from previously presented scene are not likely to have been saved in the content buffer 130. Further, future presenting scenes will not be in the buffer 130, and may not have even been received in a broadcasting media content event. And, other image data that might be used would never be in the content buffer 130.

Preferred embodiments of the 3D model data generation system 100 solve this unique problem by separately accessing the media content event from another source. That is, the 3D model data generation system 100 is able to access the entirety of the media content event so that a sufficient number of video image frames having images of the physical object of interest may be identified and selected for analysis. One skilled in the art appreciates that 3D model generation based on passive modeling techniques requires a relatively large number of images of an object of interest that have been taken from different viewpoints. The greater the number of images of the physical object of interest that can be analyzed, especially when the physical object of interest is shown from different camera viewpoint angles, the likelihood that an accurate and reliable 3D model may be generated from images in the media content event increases. Further, the analysis of video image frames of a media content event to identify images of the physical object of interest, and then the attendant processing of the images of the physical object of interest, is a computationally intensive effort that takes some duration of time to complete. Since the media content event can be selectively and independently accessed in its entirety from another memory medium, embodiments of the 3D model data generation system 100 can create accurate and reliable 3D model data on a user-selected physical object of interest.

Although separate access to the media content event is preferred, in some situations separate access to the media content event is not possible. If the media content event is not accessible from another memory medium, then generation of accurate and reliable 3D model data based on image data stored in the content buffer 130 and/or later received image data in the continuing broadcast of the media content event becomes problematic. However, if the media content event is not separately accessible, embodiments of the 3D model data generation system 100 store the remaining portion of the presented media content event, such as in the DVR 132 or another suitable memory medium. The stored remaining portion of the media content event may be analyzed to generate the 3D model data of the physical object of interest. Here, if the generated 3D model data is not accurate or does not provide acceptable quality, then the 3D model data may be supplemented with data from other sources such that an acceptable quality 3D model is generated.

One skilled in the arts appreciates that that in some scenes, the filming of the physical object of interest will potentially occur at different times in the scene, such as when multiple cameras are filming from different viewpoints in an alternating manner during scene filming. For example, if the physical object of interest is an actor or animated character, images of the scene may change alternatively between the actor or animated character of interest and other actors or animated characters. For example, images of the actor or animated character of interest may be available from the series of scene portions captured by a first camera, while images of the actor or animated character of interest may not be available from another series of scene portions captured by a second camera.

Accordingly, a unique problem in generating a 3D model of a physical object of interest arises in the use of media content events in that even if a particular physical object is identifiable in a scene, that particular physical object of interest may no be included in all video image frames of the scene. Embodiments of the 3D model data generation system 100 solve this problem by identifying particular video image frames that present the physical object of interest from other video image frames of the scene that do not present images of the physical object of interest.

Images of the physical object of interest (for example, an actor or animated character) obtained from analyzed video image frames taken by the first camera may have a relatively smooth viewpoint transition from one accessed video image frame to the next. That is, the change in the movement of the various vertices of the physical object of interest may not be relatively large. Further, the relative size of the images of the physical object of interest obtained from analyzed video image frames taken by the first camera may be approximately the same. Similarly, the extents of the physical object of interest may be in a relatively similar location in the video image frame from one video image frame to the next video image frame.

Video image frames captured by the second camera may not include images of the physical object of interest. Such video image frames are identifiable, and would not be analyzed in any significant detail to conserve computation resources.

However, images of the same physical object of interest may have been taken by the second camera. Here, images of the physical object of interest may be quite different from images taken by the first camera. For example, the size of the physical object of interest determined from images taken by the second camera may be significantly larger or smaller that the size of the images of the physical object of interest taken by the first camera. Also, since it is highly probable that the first camera and the second camera are filming the scene from different viewpoints, the location of determined vertices and/or the extents of the physical object of interest will abruptly change as the images are filmed by the first camera and the second camera.

Accordingly, embodiments of the 3D model data generation system 100 are configured to identify groups of images of the physical object substantially similar, and thus, have been likely filmed by a particular camera during filming of the scene. Other images of the object of interest filmed by a different camera are likely to be quite different from the images of the physical object of interest filmed by the first camera. Thus, video image frames having the physical object of interest filmed by the first camera are identified and then grouped together, while video image frames having the physical object of interest filmed by the second camera are identified and then grouped together.

Images of the physical object of interest from each group may then be analyzed together. The groups of video image frames provide image information that can be analyzed using passive modeling techniques so that the depth attributes of the various portions of a particular physical object of interest can be reliably and accurately determined.

When the images of the physical object of interest are quite different from each other, such as when the physical object of interest is filmed using multiple cameras each at different set locations and each having different viewpoints, embodiments of the 3D model data generation system 100 are configured to compensate the image information for a physical object of interest so that the depth attributes of the various portions of a particular physical object of interest can be reliably and accurately determined.

Image data compensation begins with identification of a plurality of vertices of the physical object of interest in each analyzed image. Here, vertices correspond to a point location in 3D space of a portion (associated with a feature of the physical object of interest) that is visible in the image of the physical object of interest. For example, if the physical object of interest is an actor or animated character, vertices for different portions of the image of the physical object of interest are defined, such as for the nose of the actor or animated character, the left ear and the right ear of the actor or animated character, and the chin of the actor or animated character. Many identifiable and distinct vertices can be identified for the various portions of the physical object of interest.

One skilled in the art appreciates that 3D model data is generated based upon a collection of point locations in 3D space (interchangeably referred to herein as vertices). When a plurality of images of the physical object of interest taken from different viewpoints are used to generate the 3D model data using passive modeling techniques, the relationship between like vertices in the series of analyzed images are determined so that depth attributes of the various portions of the physical object of interest can be determined. This process of obtaining a series of images of the physical object of interest, of identifying the vertices for the physical object of interest, and then correlating or otherwise relating like vertices, is generically referred to herein as a "stitching" process. Thus, a series of images of the physical object of interest that are obtained from the scene of the media content event, from different scenes of the media content event, from different media content events, and/or from different sources, are compensated and are then stitched together to create a changing perspective (viewpoint) of the physical object of interest. That is, the obtained images are compensated as necessary so that the determined like vertices among the different images correlate with each other. After compensation, the plurality of images of the physical object of interest can then be "stitched" together such that the depth attributes of the various portions of the physical object of interest can be determined. Finally, a complete 3D model can be generated. Any suitable image compensation and/or image stitching process used by the variously available passive modeling techniques may be employed by embodiments of the 3D model data generation system 100.

In an example application, a plurality of first vertices defined from a first one of the images of the physical object of interest (derived from analysis of a first video image frame) are compared with like vertices defined from a second one of the images of the physical object of interest (derived from a second video image frame). Like vertices correspond to the same point location on the object of interest.

In an example embodiment, a plurality of selected first vertices of the first image are compared with each other to define a first relationship, such as a distance between two vertices.

One skilled in the art appreciates that any number of vertices may be correlated with each other to define one or more relationships between the vertices.

Then, a plurality of like second vertices are selected from the second image. The same relationship (a second relationship) between the plurality of second vertices is defined. The first relationship and the second relations are compared with each other. If the first image and the second image were derived from the same scene and were captured by the same camera, it is highly probable that the first relationship and the second relationship are the same, or are substantially the same. That is, the vertices of the two images will highly correlate with each other. Here, the amount (distance) of the change in movement and direction of movement in the like vertices of the compared images of the physical object of interest will be relatively small. Therefore, the comparison of the like vertices will enable the determination of depth attributes of the corresponding portions of the physical object of interest that are associated with the like vertices.

However, if the corresponding first and second relationships determined from like vertices do not correlate well with each other, then embodiments of the 3D model data generation system 100 compensate the image data of one of the video image frames so that the compensated image then has like vertices that have an improved correlation. For example, a first image of an actor or animated character may be determined from an image taken by a first camera, and a second image of the actor or animated character may be determined from an image taken by a second camera. Here, the image size of the actor or animated character may be significantly different from the first analyzed image of the physical object of interest (captured by the first camera) and the second analyzed image of the physical object of interest (captured by the second camera). So, if the relationship between two like vertices are compared, then the degree of difference between the like vertices (or the relationship) may be used to define an amount of compensation. For example, if two vertices determined from a first image of the physical object of interest are a distance "x" apart, and if the two like vertices determined from the second image of the physical object of interest are a distance of "y" apart, then the ratio between the "x" and "y" distances can be used to define an amount of compensation that should be applied to one of the images of the physical object of interest.

Accordingly, an example embodiment compensates one of the images of the physical object of interest so that the relative size of the actor or animated character is scaled or adjusted to be have the same size, or substantially the same size, and the size of the image of the physical object of interest in the other image. Accordingly, like vertices of the compensated image can then be re-determined. Since the size of the physical object of interest is the same, or is substantially the same, in the two compared images, the depth attributes of the portion of the physical object of interest can be reliably and accurately determined from the like vertices.

The amount of compensation may be based on differences between a plurality of vertices in the first image and like vertices in the second image. For example, a distance from the nose and chin vertices of the first image may be compared with the corresponding chin and nose vertices of the second image, and then a scaling factor is derived therefrom. After scaling, the relative size of the images will be comparable such that changes in the location of like vertices between the first image and the second image can be used to compute depth attributes of the various portions of an actor or animated character. Thus, embodiments of the 3D model data generation system 100 solve the unique problem that arises when different cameras are filming the physical object of interest from different camera locations and/or different viewpoints (with respect to the physical object of interest).

An example embodiment of the 3D model data generation system 100 standardizes the image data of a physical object of interest for each image of the object of interest. For example, each image of the physical object of interest may be compensated to a standardized or predefined size. Then, images of the physical object of interest filmed by different cameras during the filming of the scene can then be compared with each other such that the determined like vertices are highly correlated with each other.

Further, embodiments of the 3D model data generation system 100 may be configured to generate the 3D model of the physical object of interest that has been filmed in different scenes of the media content event. A plurality of images of the physical object of interest can be generated from the video image frames of the different scene. Then, the image data from the other scene may be compensated so that the compensated images correspond to the images of the physical object of interest from the scene that was being presented when the initial user request was generated. Alternatively, the image data from the other scene may be compensated so that the compensated images correspond in accordance with a predefined standard. That is, compensation of the image data may be used to adjust images of the physical object of interest that were taken from the different scenes in the media content event. Here, the compensated images from the different scene will then correspond to images of the physical object of interest taken from the scene being presented at the time the user request was generated.

Similarly, if embodiments of the 3D model data generation system 100 are basing the generation of the 3D model on the physical object of interest that has been filmed in scenes of a different media content event, then the compensation of the image data may be used to adjust images of the physical object of interest that were taken from the different media content event. Further, if still images and/or videos having images of the physical object of interest are obtained from non-media content type events, such as from a catalogue or the like of still images, the embodiments of the 3D model data generation system 100 similarly compensate the image data to adjust the image of the physical object of interest to correlate with images of the physical object of interest determined from the scene being presented at the time the user request was generated.

Another unique problem is encountered in generation of a 3D model from images of a physical object of interest extracted from scenes of a media content event. The problem is that not all view angles of the selected physical object of interest are shown in the media content event. For example, the physical object of interest may be the helicopter 304 (FIG. 3). During the filming of the media content event, the backside or obverse side of the helicopter 304 may never had been filmed. Accordingly, there will be no available images of the backside or obverse side of the helicopter 304 from the filmed scene that can be used to generate a 3D model that includes the filmed portions of the helicopter 304 and the un-filmed portions of the helicopter 304.

Embodiments of the 3D model data generation system 100 may be configured to employ a novel feature to complete a 3D model that includes portions of a model of the physical object of interest that were not filmed in the scene of the media content event. A first novel solution is referred to herein as "hidden side" estimation wherein the shape and/or form of a side of the physical object of interest that has not been filmed (referred to herein as a hidden side) is estimated based on determined characteristics associated with the corresponding filmed side of the physical object of interest.

For example, if the backside or obverse side of the helicopter 304 was not filmed (and is thus a hidden side), one skilled in the art appreciates that various assumptions can be made so that the attributes of the hidden side of the helicopter 304 can be estimated. A first assumption is a "mirror image" assumption. Here, an assumption is made that the hidden side of the physical object of interest is a mirror image of the visible opposing side of the physical object of interest. A plane that divides (bisects) the physical object of interest into halves is defined. Then, identified vertices of the visible side of the physical object of interest are identified. That is, a plane is defined that bisects the physical object of interest into a first mirror image half that is visible in the plurality of second video image frames and a second mirror half that includes at least the hidden side of the physical object of interest. Mirror image vertices are defined for the obverse side, wherein each corresponding one of the mirror image vertices is defined based on a corresponding visible like vertex. The location of a projection of the mirror image vertex on the defined plane is at the same location of the projection of the corresponding visible like vertex on the defined plane. A location of the mirror image vertex out from the defined plane is the same as a distance of the corresponding visible like vertex from the defined plane. Further, a plurality of different planes may be defined as needed for the physical object of interest such that various hidden sides of the physical object of interest may be estimated.

Looking at the example helicopter 304, one skilled in the art can appreciate that it is highly likely that the hidden side of the helicopter 304 is substantially the same as, or even identical to, the visible side of the helicopter 304. A plane bisecting the helicopter 304 along its length may be defined. Then, the hidden image vertices can be defined from the corresponding like vertices on the visible side of the helicopter 304. Accordingly, 3D model data can be estimated for the hidden backside of the helicopter 304.

When using this particular estimation process, embodiments of the 3D model data generation system 100 are configured to identify a category that is associated with the physical object of interest. If the physical object of interest falls into a category of objects where the mirror image assumption is applicable, then the hidden backside or obverse side of the helicopter 304 can be estimated on the assumption that the hidden backside is the same, or even identical, to the shown opposing side of the physical object of interest. Categories of physical objects for which the mirror image assumption is applicable are common fixed-shape objects, such as automobiles, aircraft, water vessels, flower vases, side views of animals or people, or the like. Other physical objects of interest, such as an actor and/or a cartoon character, may not be particularly suitable for model estimation using the mirror image assumption. Thus, alternative estimation techniques are used if the mirror images assumption cannot be used.

One skilled in the art appreciates that the degree of correlation between the hidden side and the visible side of a physical object of interest may vary. For example, the hidden side of the helicopter 304 may be presumed to be identical to the visible side of the helicopter 304. On the other hand, the hidden side of the cow 302 may be substantially similar, but not identical to, the visible side of the cow 302. Here, the general shape and form of the hidden side of the cow 302 may be approximately estimated based on the visible side of the cow 304. However, some attributes of the hidden side of the cow 302, such as coloring and/or pattern markings, may be different. Accordingly, embodiments of the 3D model data generation system 100 estimate one or more attributes of a hidden side of the physical object of interest based on another assumed characteristic or attribute. Then, the hidden side of the physical object of interest may be completed based on the assumed information.

Such assumed information or assumed characteristics may be obtained from other sources. For example, after the shape and form of the hidden side of the cow 302 are estimated, then embodiments of the 3D model data generation system 100 may optionally search other media content events and other sources to obtain supplemental information to complete the modeling of the hidden side. For example, an image of a similar cow may be found in another source, and its color and/or pattern markings may be used to complete the model of the hidden side of the cow 302.

Alternatively, or additionally, characteristics of and/or an identification of the physical object of interest may be used to define the bisecting planes that may be used to estimate the hidden vertices. For example, if the helicopter 304 is itself recognized as being a helicopter, then information may be retrieved from memory that indicates that the bisection plane used for hidden vertices estimation must be along the length of the helicopter along a vertical orientation. One skilled in the art appreciates that if other bisecting planes are defined in error, any estimated vertices that are based on an inappropriate bisecting plane will be invalid. That is, embodiments of the 3D model data generation system 100 are configured to identify a type of physical object that the physical object of interest is a member of, and then access information that defines the particular bisection planes that may be chosen for accurate estimation of the hidden vertices.

Another estimation process used by the various embodiments of the 3D model data generation system 100 is a "like object" estimation. Here, embodiments identify a particular category that the physical object that the physical object of interest is a member of. Then, 3D model information from other objects in that category may be accessed to determine the hidden vertices for the physical object of interest. Alternatively, or additionally, images of the hidden side of a like physical object in the same category may be accessed, and then used to determine the hidden vertices of the physical object of interest. Image data for the other sources may be compensated as described herein so that the vertices of the accessed images correspond to vertices determined from images of the physical object of interest.

For example, a user-selected physical object of interest may be an automobile of a certain make, year and model. Embodiments of the 3D model data generation system 100 may first determine that the physical object of interest is an automobile (identifiable by a certain make, year and model). Embodiments then access 3D model information for another automobile (that is in the same category that has the same make, year and model) from another source, such as a remote web site or the like. Alternatively, or additionally, images of the same make, year and model automobile may be accessed from another source. Accordingly, the hidden sides of the automobile that is the physical object of interest may then be estimated. Hidden sides may include the automobile undercarriage, the front end view, the rear end view, and/or the obverse side of the automobile.

One skilled in the arts appreciates that some portions of the physical object of interest may not be readily discernible from the captured images of the physical object of interest obtained from the media content event. Some embodiments of the 3D model data generation system 100 may be configured to replace any determined portions of the physical object of interest with replacement 3D model portions. The replacement portions can be determined from other images in the media content event, images from other media content events or other sources, and/or may be received as 3D model data that is incorporated into the generated 3D model data. For example, the rotor blades of the example helicopter 304 may not be readily discernible from images shown in the media content event. Yet, one skilled in the arts appreciates that all helicopters have rotor blades that rotate about the top of the helicopter during flight. Accordingly, a plurality of helicopter rotor blades may be added to the generated 3D model data to provide an improved printed 3D object that is based on the generated 3D model data of the visible helicopter 304 as viewed by the user in the media content event.

In the various embodiments, once a 3D model has been generated at the media device 102, the 3D model data may be optionally processed into a graphical image and then presented on the display 110 so that the user may preview the generated model. If the user is satisfied with the generated 3D model, they may provide a user response indicating that the 3D model generated from the media content event (and/or other sources of image data and/or model data) is adequate.

Alternatively, the user may provide a different user response that indicates that the user is not satisfied with the generated 3D model. In response to receiving the user response indicating that the user is not satisfied, embodiments of the 3D model data generation system 100 may be optionally configured to continue searching the media content event, other media content events, and/or other sources for additional images of the physical object of interest so that the initially generated 3D model data can be enhanced. The 3D model review process may be repeated until the user is satisfied with the quality and accuracy of the generated 3D model data.

Some embodiments of the 3D model data generation system 100 are configured to permit the user to modify one or mote attributes of the generated 3D model. For example, the user may wish that the color of a printed object of interest, or a portion thereof, be different from the color(s) of the physical object of interest viewed by the user. Accordingly, a graphical user interface (GUI) is provided to the user to select a different color for the 3D model. Alternatively, or additionally, the GUI may be configured to permit the user to select a portion of the 3D model having a color that the user wishes to specify. In an example embodiment, the presented GUI may show the identified color(s) that has been determined for the generated 3D model viewed in the media content event. The user may then select a color of interest of the 3D model, and then specify a different color that is to be used to modify the 3D model. The different color may be selected from a presented color palette or from a plurality of color options indicated on the GUI to the user. In another example, the user may be able to operate the GUI to select a portion of interest of the 3D model. Then, the user may specify the color for that select portion.

Alternatively, or additionally, the user may wish to change the dimensions of all of, or a part of, the 3D model generated from the media content event. For example, the user may wish to have a larger or a smaller manufactured (printed) physical object. During the review of the generated 3D model, dimension information may be presented to the user. The GUI may be configured to receive user specifications for one or more dimensions of interest. For example, the user may specify a scaling factor that is applied to adjust all of the dimensions of the 3D model. Alternatively, or additionally, the user may specify a single dimension, such as height or width, such that the 3D model dimensions are then scaled to the specified dimension. Alternatively, or additionally, the GUI may be configured to permit the user to select a portion of the 3D model that is to be scaled. In some instances, only that portion of the 3D model is modified in accordance with the specified dimension. Alternatively, all dimensions of the 3D model are adjusted based on the dimension specification for the portion of the 3D model while other dimensions of the 3D model.

An example of anther modification to the 3D model that the user may make include specification of materials. One skilled in the art understands that a variety of materials may be used to manufacture a printed 3D object using the printers 112, 114. Accordingly, the GUI may permit the user to specify materials that are to be used when the 3D model is printed by one of the printers 112, 114. Accordingly, the specified material information is added to the 3D model data. The media device 102 and/or the 3D model site 104, during the 3D model generation process, may use the specified materials to create the printed 3D object.

Another example of a modification to the 3D model is an addition of logos, trademarks, patent information, or the like that is associated with a particular producer or holder of merchandising rights for the media content event. This information may be embedded in the media content event. Alternatively, or additionally, the media device 102 or the 3D model site 104 may access a remote site and retrieve the logo, trademark, patent information, or the like that is associated with the media content event. The media device 102 and/or the 3D model site 104, during the 3D model generation process, may be configured to automatically add a logo, trademark, patent information, or the like to the 3D model data such that when the 3D model is used to manufacture or print the physical object, the logo, trademark, patent information, or the like is included in the printed 3D physical object.

Once the user has modified the 3D model generated from the media content event, the modified 3D model data is saved into the memory medium 128, 206. The modified 3D model data may then be later retrieved and used by the owner or another interested party to print a 3D object and/or to make further modifications to. In some embodiments, a 3D model generated from the media content event may be communicated to a remote site for storage.

In some embodiments, information identifying the scene of the media content event and/or the presentation time information corresponding to the time that the user viewed the physical object of interest and/or generated the initial user request is included as part of the 3D model data. Alternatively, or additionally, scene information and/or presentation time information for other portions of the media content event in which the physical object of interest was shown in the media content event is included. Then, this scene and/or presentation time information may be used to place tags into the media content event at those identified scenes and/or at those identified presentation times. When the media content event is later viewed by the user and or other users, such as if provided on a DVD or if later broadcasted to a plurality of media devices 102, the inserted tags may be used to access the stored 3D model that was previously generated from the media content event. Further, the inserted tag may be used to generate an icon or the like which indicates that a 3D model is available. Such a presented icon may be selectable by the user to initial the user request. For example, a user request is received at a time that the tag is in the media content event (or at a time when the tag is in the associated scene). In response to a user request, the tag and/or information associated with the tag may be sent to the remote site. The tag may be used to more quickly identify the viewed physical object of interest and/or provide 3D model data to the requesting user. The remote site may then identify the physical object of interest and/or provide the 3D model data to the user's media device, another electronic device, and/or one of the printers 112, 114. Alternatively, or additionally, the tag and 3D model data may be included in the media content event itself so as to be immediately accessible to the media device 102 and/or the 3D model site 104.

In alternative embodiments where the 3D model site 104 remotely generates the 3D model data, the confirmation information is generated by the 3D model site 104. The confirmation information is then communicated to the media device 102. The media device 102 may then present the user confirmation image 300, receive the user's confirmation and/or selection, and then communicate that information back to the 3D model site 104. The 3D model site 104 can then access additional information to generate an enhanced 3D model for consideration by the user.

In some situations, the 3D model that is generated from the image frame analysis of the media content event and/or other sources does not provide an acceptable quality 3D model. Alternatively, or additionally, it may be desirable to improve the quality of the 3D model.

To improve the quality of the 3D model, in some embodiments, the media device 102 and/or the 3D model site 104 may access specifications for 3D models of similar physical objects that correspond to the physical object of interest viewed by the user. One or more attributes of the accessed 3D model(s) are compared with corresponding attributes of the 3D model generated from the media content event. If the corresponding attribute(s) from the accessed 3D model would otherwise improve the corresponding attribute of the 3D model generated from the media content event, that attribute from the accessed 3D model may be used to compensate the 3D model data for that attribute and/or may be used to replace that attribute in the 3D model generated from the media content event.

For example, a portion of the physical object of interest viewed by the user may be shown in a limited number of video image frames in the media content event. With a limited number of video image frames showing a particular portion of the physical object of interest, accurate and reliable depth attributes of that particular portion of the physical object of interest cannot be determined. That is, if an insufficient number of video image frames showing that portion of the physical object of interest are available, the 3D model data for that portion will not be a good representation for that portion. Accordingly, the 3D model data for a similar object may be accessed from a remote location, and then the 3D model data for that portion may be accessed. The accessed 3D model data for that particular portion may be used to compensate or replace the corresponding portion of the 3D model data that is associated with the inadequate 3D model data that was generated from the media content event. The replaced or compensated portion of the 3D model data may be based on a single instance of the accessed 3D model data, or may be based on a plurality of accessed 3D model data that are associated with a plurality of similar or like physical objects that correspond to the physical object of interest viewed by the user.

In the various embodiments, once a satisfactory 3D model has been generated at the media device 102, the 3D model data may be saved into the 3D model catalogue 152 of the memory medium 128 of the media device 102. At some later point in time, the stored 3D model may be accessed so that a printed 3D object can be manufactured (printed) therefrom. Further, the 3D model data may be optionally communicated to the 3D model catalogue 152 of the 3D model site 104 for use by other users.

As described herein, the 3D model data may be remotely generated by the 3D model site 104. Here, the media device 102 captures a video image frame of the presenting media content event in response to receiving the user request. Then, the video image frame and information identifying the media content event are communicated from the media device 102 to the 3D model site 104.

Alternatively, the media device 102 may access presentation time information or the like that is associated with the presented video frame seen by the user. Thus, in response to receiving the user selection, the media device 102 communicates the presentation time information and the media content title or other identifying information to the 3D model site 104.

Based on the information received from the media device 102, the 3D model site 104 may then generate the 3D model data as described herein. Once the 3D model data has been generated at the 3D model site 104, the 3D model data may be optionally communicated to the media device 102, may be optionally stored in the 3D model catalogue 152 at the 3D model site 104, may be optionally send to a 3D printer 112, 114 for printing, and/or may be optionally communicated to other parties who are interested in that particular 3D model.

With respect to embodiments of the 3D model site 104 that remotely generate the 3D model data, the 3D model site 104 must receive an indication of a particular one of the physical objects in the video image frame that is to be the user selected object of interest. In an example embodiment, the media device 102 identifies one or more candidate physical objects of interest from an video image frame selected from the scene being presented at the time the user request was generated. The media device 102 then presents images of candidate objects of interest on the display 110 that are selectable by the user. Once the user has selected one of the candidate physical objects of interest, information that identifies the user-selected physical object of interest and the particular viewed media content event is communicated from the media device 102 to the 3D model site 104. The 3D model site 104 then accesses the identified media content event. Based on the accessed media content event (and other media content events and/or other sources if needed), and based on the indicated physical object of interest, the remote 3D model site 104 then generates the 3D model data as described herein.

It should be emphasized that the above-described embodiments of the 3D model data generation system 100 are merely possible examples of implementations of the invention. Many variations and modifications may be made to the above-described embodiments. All such modifications and variations are intended to be included herein within the scope of this disclosure and protected by the following claims.

What is claimed:

1. A system comprising:
   one or more processing devices; and
   memory communicatively coupled with and readable by the one or more processing devices and having stored therein processor-readable instructions which, when executed by the one or more processing devices, cause the one or more processing devices to perform operations comprising:
   processing a user request;
   responsive to the user request, accessing a video image frame of a scene of media content;
   identifying an object that is represented in the video image frame;
   accessing a plurality of video image frames from the scene of the media content;
   identifying the object represented in at least some video image frames of the plurality of video image frames; and
   generating 3D model data based at least in part on the at least some video image frames of the plurality of video image frames that were accessed from the scene of the media content.

2. The system as recited in claim 1, where the video image frame corresponds to a video image presented in the scene of the media content at a time that the user request is generated.

3. The system as recited in claim 1, the operations further comprising:
   outputting an image of the object; and
   processing a user confirmation corresponding to the image of the object;
   where the accessing the plurality of video image frames is consequent to the processing the user confirmation.

4. The system as recited in claim 3, the operations further comprising:
   generating a confirmation image that comprises the image of the object;
   where the outputting of the image of the object corresponds to outputting the confirmation image for presentation; and
   where the user confirmation is responsive to the outputting the confirmation image.

5. The system as recited in claim 1, the operations further comprising:
   generating one or more images of the object from the at least some video image frames of the plurality of video image frames;
   where the generating the 3D model data is based at least in part on the one or more images.

6. The system as recited in claim 1, where the user request is received while the media content is being presented.

7. The system as recited in claim 1, further comprising a media device that outputs the scene of the media content for presentation, the media device comprising the one or more processing devices.

8. The system as recited in claim 1, where the one or more processing devices are remote from a media device that outputs the scene of the media content for presentation.

9. The system as recited in claim 8, where the user request is received from the media device.

10. The system as recited in claim 9, where the video image frame corresponds to a video image in the scene of the media content output for presentation by the media device.

11. One or more non-transitory, machine-readable media having machine-readable instructions thereon which, when executed by one or more processing devices, cause the one or more processing devices to perform operations comprising:
    processing a user request;
    responsive to the user request, accessing a video image frame of a scene of media content;
    identifying an object that is represented in the video image frame;
    accessing a plurality of video image frames from the scene of the media content;
    identifying the object represented in at least some video image frames of the plurality of video image frames; and
    generating 3D model data based at least in part on the at least some video image frames of the plurality of video image frames that were accessed from the scene of the media content.

12. The one or more non-transitory, machine-readable media as recited in claim 11, where the video image frame corresponds to a video image presented in the scene of the media content at a time that the user request is generated.

13. The one or more non-transitory, machine-readable media as recited in claim 12, the operations further comprising:

outputting an image of the object; and processing a user confirmation corresponding to the image of the object;

where the accessing the plurality of video image frames is consequent to the processing the user confirmation.

14. The one or more non-transitory, machine-readable media as recited in claim 13, the operations further comprising:

generating a confirmation image that comprises the image of the object;

where the outputting of the image of the object corresponds to outputting the confirmation image for presentation; and where the user confirmation is responsive to the outputting the confirmation image.

15. The one or more non-transitory, machine-readable media as recited in claim 11, the operations further comprising:

generating one or more images of the object from the at least some video image frames of the plurality of video image frames;

where the generating 3D model data is based at least in part on the one or more images.

16. The one or more non-transitory, machine-readable media as recited in claim 11, where the user request is received while the media content is being presented.

17. The one or more non-transitory, machine-readable media as recited in claim 11, further comprising a media device that output the scene of the media content for presentation, the media device comprising the one or more processing devices.

18. The one or more non-transitory, machine-readable media as recited in claim 11, where the one or more processing devices are remote from a media device that output the scene of the media content for presentation.

19. The one or more non-transitory, machine-readable media as recited in claim 18, where the user request is received from the media device.

20. A method comprising:

processing a user request;

responsive to the user request, accessing a video image frame of a scene of media content;

identifying an object that is represented in the video image frame;

accessing a plurality of video image frames from the scene of the media content;

identifying the object represented m at least some video image frames of the plurality of video image frames; and generating 3D model data based at least in part on the at least some video image frames of the plurality of video image frames that were accessed from the scene of the media content.

* * * * *